US009598574B2

(12) United States Patent
Dingemans

(10) Patent No.: US 9,598,574 B2
(45) Date of Patent: Mar. 21, 2017

(54) MOLECULAR COMPOSITES BASED ON HIGH-PERFORMANCE POLYMERS AND AN INTERPENETRATING LIQUID CRYSTAL THERMOSET

(71) Applicant: Allotropica Technologies Inc., Chapel Hill, NC (US)

(72) Inventor: Theodorus Jacobus Dingemans, Delft (NL)

(73) Assignee: ALLOTROPICA TECHNOLOGIES INC., Chapel Hill, NC (US)

( * ) Notice: Subject to any disclaimer, the term of this patent is extended or adjusted under 35 U.S.C. 154(b) by 0 days.

(21) Appl. No.: 14/785,170

(22) PCT Filed: Apr. 16, 2014

(86) PCT No.: PCT/NL2014/050236
§ 371 (c)(1),
(2) Date: Oct. 16, 2015

(87) PCT Pub. No.: WO2014/171822
PCT Pub. Date: Oct. 23, 2014

(65) Prior Publication Data

US 2016/0068680 A1 Mar. 10, 2016

(30) Foreign Application Priority Data

Apr. 16, 2013 (NL) ..................................... 2010646

(51) Int. Cl.

| | |
|---|---|
| ***C08F 8/00*** | (2006.01) |
| ***C08L 27/00*** | (2006.01) |
| ***C08L 81/00*** | (2006.01) |
| ***C08L 81/06*** | (2006.01) |
| ***C09K 19/30*** | (2006.01) |
| ***C09K 19/32*** | (2006.01) |
| ***C09K 19/38*** | (2006.01) |
| ***C08L 61/16*** | (2006.01) |
| ***C08L 79/08*** | (2006.01) |
| *C09K 19/04* | (2006.01) |
| *C09K 19/54* | (2006.01) |

(52) U.S. Cl.
CPC ............... *C08L 81/06* (2013.01); *C08L 61/16* (2013.01); *C08L 79/08* (2013.01); *C09K 19/3087* (2013.01); *C09K 19/322* (2013.01); *C09K 19/3809* (2013.01); *C09K 19/3814* (2013.01); *C09K 19/3823* (2013.01); *C08L 2201/02* (2013.01); *C08L 2207/04* (2013.01); *C09K 2019/0448* (2013.01); *C09K 2019/546* (2013.01)

(58) Field of Classification Search
CPC .............. C09K 19/3087; C09K 19/322; C09K 19/3809; C09K 19/3814; C09K 19/3823; C09K 2019/0448; C09K 2019/546; C08G 69/44; C08G 73/16; C08L 81/06; C08L 61/16; C08L 79/08; C08L 2201/02; C08L 2207/04
USPC .................................................. 525/150, 152
See application file for complete search history.

(56) References Cited

U.S. PATENT DOCUMENTS

| | | | | |
|---|---|---|---|---|
| 2009/0224203 A1* | 9/2009 | Jung | .................. C07D 207/452 | 252/299.61 |
| 2009/0308643 A1* | 12/2009 | Cho | ...................... C07C 233/65 | 174/256 |

FOREIGN PATENT DOCUMENTS

| | | |
|---|---|---|
| CN | 1986639 | 6/2007 |
| EP | 1375112 | 1/2004 |
| JP | 2001226538 | 8/2001 |
| WO | 0222706 | 3/2002 |
| WO | 2007073184 | 6/2007 |

OTHER PUBLICATIONS

International Search Report based on International Application PCT/NL2014/050236, 2014.

* cited by examiner

*Primary Examiner* — William Cheung
(74) *Attorney, Agent, or Firm* — Lucas & Mercanti, LLP

(57) ABSTRACT

The invention is directed to a polymeric composition comprising a first polymer (in particular HPP) and a liquid crystal thermoset (LCT) network that interpenetrates said first polymer, which LCT network comprises LCT oligomers that are at least partly polymerized, as well as to a method for preparing such. The polymeric composition of the invention does not separate into two distinct polymer phases (first polymer and LCT) over time and has improved thermo-mechanical properties. In particular, the invention may be used to improve the properties of HPP. The polymeric composition can be used as a high-resistant material, in particular having improved heat resistance.

19 Claims, No Drawings

MOLECULAR COMPOSITES BASED ON HIGH-PERFORMANCE POLYMERS AND AN INTERPENETRATING LIQUID CRYSTAL THERMOSET

CROSS-REFERENCE TO RELATED APPLICATIONS

This application is a 371 of PCT/NL2014/050236 filed Apr. 16, 2014, which claims the benefit of Dutch Patent Application No. 2010646, filed Apr. 16, 2013.

BACKGROUND OF THE INVENTION

The invention pertains to polymeric materials. More specifically, the invention is directed to specific blends of polymers, which can be mixed on a molecular level.

In the art so called high-performance polymers (HPPs) are known. These are typically all-aromatic polymers, such as liquid crystal polymers (LCP), polyethersulfone (PES), polyimide (PI), polyetherimide (PEI), polyetheretherketone (PEEK), polyetherketoneketone (PEKK), polyphenylene sulfide (PPS) or polyaryletherketone (PAEK).

It has been suggested to use non-reactive, high molecular weight LCPs to modify high-performance polymers (HPPs) such as PPS (see for instance Gopakumar et al., Polymer 39(1998)2221-2226), PES (see e.g. He et al., Polymer 35(1994)5061-5066), PEI, PEEK (e.g. Goel et al., Materials and Manufacturing Processes 16(2001)427-437) or PEKK, in particular to improve the processability of these polymers and to obtain "molecular composites" with improved thermo-mechanical behavior. Although processing could indeed be improved it was found that the HPPs appear to form incompatible molten phases with the LCPs. Upon cooling the melt separates in two distinct phases (HPP and LCP). As a result this method can not be used to prepare molecular composites wherein the LCP is a molecular dispersed reinforcement.

It is an object of the invention to provide polymeric compositions comprising HPPs that do not suffer from phase separation as in the prior art. It is a further object of the present invention to provide such compositions wherein the mechanical properties of the HPPs are improved.

BRIEF SUMMARY OF THE INVENTION

The invention is directed to a polymeric composition comprising a first polymer (in particular HPP) and a liquid crystal thermoset (LCT) network that interpenetrates said first polymer, which LCT network comprises LCT oligomers that are at least partly polymerized.

The invention is further directed to a method for preparing the polymer composition of the first aspect. The method comprises the steps of providing a melt of a polymer blend comprising a first polymer (in particular HPP) and a LCT precursor (in particular LCT oligomers) and initiating polymerization, in particular by LCT chain extension and cross-linking, in at least part of the LCT precursors. Upon polymerization, the LCT precursors form a highly dispersed liquid crystal network in the first polymer matrix, thereby forming a true molecular composite. This means that the first polymer and LCT form a homogeneous mixture at a molecular level.

The inventor found that the polymeric composition of the invention does not separate into two distinct macroscopic polymer phases (first polymer and LCT) over time. Without wishing to be bound by any theory, it is believed that the crosslinked liquid crystal network interpenetrating the first polymer prevents the two polymer phases from separating.

It was found that the LCT network improves the properties of the first polymer. In particular, the polymeric composition shows improved thermo-mechanical properties (e.g. improved tensile strength and E-modulus) compared to pure first polymer.

In particular, the invention may be used to improve the properties of HPPs. HPPs are being used in ever more demanding applications, e.g. at high temperatures and/or harsh environments. The method of the invention provides for HPPs to be suitably used under such conditions.

Also, the polymeric composition can be used to crosslink upon exposure to external heat sources. This is particularly useful for making fire resistant products. In such products the LCT prevents the thermoplastic host HPP (matrix) from softening (losing shape) and dripping (spreading the fire). For this kind of application the oligomer is typically blended into the polymer host and is only allowed to partially chain extend/crosslink.

The polymeric composition can be used as a high temperature-resistant material, in particular having improved heat resistance.

DETAILED DESCRIPTION OF THE INVENTION

The polymeric composition of the invention comprises two polymers. The first polymer is typically a high-performance polymer (HPP), while the other polymer is a liquid crystal thermoset (LCT). Both polymers are described in detail below. The polymeric composition may also be referred to as a "molecular composite" or a "(macro) molecular polymer composite", which term emphasizes that the composition is made from two or more different polymers and is highly mixed.

The first polymer is usually the main component and the composition accordingly comprises typically 50-99.9 wt. % (preferably 60-99 wt. %, more preferably 70-95 wt. %) of the first polymer, based on the total weight of the composition.

The liquid crystal thermoset network is considered to improve the properties of the first polymer and is typically present as a minor component. Thus, the composition may comprise 0.1-50 wt. % (preferably 1-40 wt. %, more preferably 5-30 wt. %) of the LCT network, based on the total weight of the composition.

The liquid crystal thermoset network comprises LCT oligomers that are at least partly polymerized. The network is typically obtained by cross-linking LCT oligomers, as described in detail below. Thus, the network will be a network of cross-linked LCT oligomers.

The degree of crosslinking within the LCT network may range from 1-50% (all references to degrees of crosslinking as used herein are expressed on a mol/mol basis, unless indicated otherwise). Good results have been obtained with an LCT network wherein the degree of crosslinking between the LCT oligomers in the network is 5-40%.

In addition, some crosslinking may occur between the LCT and the HPP matrix.

The polymeric composition of the invention is believed to be at least partly a true molecular mixture, as evidenced in electron microscopy (SEM) micrograph images. This means that the two polymers present in the polymeric composition are mixed at least in part at the molecular level. In particular, the first polymer and the LCT network are homogeneously distributed within the polymeric composition on a molecular level when LCT concentrations are low. The network comprises LCT oligomers, which are at least partly polymerized (in particular cross-linked) throughout the matrix of the first polymer. The oligomers are thus bonded via covalent bonds. The covalently bonded LCT oligomers form a continuous network throughout the first polymer, and this continuous network may be covalently linked to the first polymer. In particular, the LCT network is a network of oligomers that are polymerized by cross-linking of the reactive terminal end-groups of the oligomers.

The polymeric composition of the invention has improved thermo-mechanical properties. The use of HPPs is normally limited by their glass transition temperature (Tg). By reinforcing HPPs with a LCT network, the HPP is provided with increased temperature resistance, such that the HPP can be suitably used at higher temperatures than in the prior art.

Furthermore, the polymeric composition may have improved strength and/or toughness. The polymeric composition may for instance have an E-modulus of 1-5 GPa. The polymeric composition may have a tensile strength of 50-100 MPa.

Values for the storage modulus (E') for conventional HPPs are typically on the order of 2-8 GPa but when aligned this value could increase to 20 GPa. The tensile strength is on the order of 60-150 MPa and when aligned this could increase to 300 MPa.

Under the influence of an applied shear field during processing the liquid crystal polymers align and this results in improved mechanical properties (strength, modulus) in the direction of alignment.

Good results have been obtained using a HPP as the first polymer and a network of cross-linked LCT oligomers. In particular preferred is the combination of a HPP and the all-aromatic LCTs defined in detail below.

Preparation

The polymeric composition of the invention can be obtained by a method comprising the steps of providing a melt of a polymer blend comprising a first polymer and a LCT precursor and initiating polymerization in at least part of the LCT precursor.

The LCT precursors are typically LCT oligomers having a MW of 500-10 000 g/mol. Preferably, the LCT precursor is the all-aromatic LCT oligomer described below. LCT oligomers have a relative low viscosity compared to LCT polymers. Such low viscosity will result in improved processability of the polymer blend in the melt compared to when high molecular weight LCP polymers would have been used as an LCT precursor.

Suitable ways of preparing the polymer blend melt are known to the skilled person. For example, the first polymer and LCT oligomer can be mixed and melted under conditions sufficient to melt the first polymer. The melt may comprise 0.1-50 wt. % of LCT oligomer (e.g. 1-40 wt. % or 5-30 wt. %), based on the total weight of the melt. The melt can be made in conventional melt using conventional techniques, such as single or twin screw extruder processing equipment.

By initiating polymerization, the LCT oligomers are cured, thereby irreversibly forming a covalently-linked polymer network that is embedded in and reinforces the first polymer. In this process, at least some of the LCT oligomers are cross-linked. Cross-linking occurs in particular between the reactive termini (i.e. reactive end-groups) of the aromatic backbones of the LCT oligomers. Initiating polymerization (chain extension/crosslinking) as used herein may therefore particularly refer to initiating cross-linking of the LCT oligomers, and in particular to initiating cross-linking of the backbone of the LCT oligomers.

Most HPP/LCT blends can be prepared without significant chain-extension taking place, since the melt blending process according to the invention is a relatively fast process.

Polymerization can be initiated by any suitable means, for example by applying heat, pressure, radiation (for instance ultraviolet, electron beam), chemical additives and combinations of these means. Polymerization or cross-linking may be conducted to obtain a final degree of crosslinking of preferably 1-50%, more preferably 5-40%.

Preferably, polymerization is initiated by heat. The temperature to which the melt is heated should be sufficiently high to induce cross-linking of the LCT. Accordingly, the melt is preferably heated to a temperature of 250-500° C., even more preferably to a temperature of 300-400° C. This is particularly desirable when the first polymer is a HPP and the LCT oligomer is an all-aromatic LCT oligomer as described below. When processing HPP melts, temperatures are typically used within the same temperature range as the temperature at which cross-linking can be initiated in the all-aromatic LCT oligomers. This allows for a relatively simple process and was also found to result in polymeric compositions having very desirable properties.

Suitable polymerization times range preferably from several minutes to 1-2 hours, more preferably from 30 to 60 minutes.

Good results have been obtained by carrying the method of the invention out in an extruder, e.g. in a twin screw extruder. A mixture of the first polymer and the LCT oligomer is heated in the extruder to obtain a polymer blend melt. The temperature used for obtaining the melt may already be sufficient to initiate polymerization of the LCT oligomers. If not, the temperature of the melt or the retention time in the extruder is increased to initiate polymerization or the final part can be polymerized during post curing after processing.

First Polymer

The first polymer used in the method of the invention and present in the composition of the invention is described in detail below.

The first polymer is preferably a high-performance polymer (HPP), more preferably a high-performance thermoplastic polymer. HPPs are well known in the art for their general high resistance, especially against heat. HPPs are commercially available. The polymer group of commercially relevant HPPs consists of a limited number of polymers. Contrary to LCTs (which are thermosets), high-performance polymers are typically thermoplastic polymers.

Typically, the HPPs used in the invention have a glass transition temperature ($T_g$) of 90-180° C., more preferably 100-150° C. Furthermore, the HPPs typically have a melting point ($T_m$) of 200-400° C., preferably 250-300° C.

The HPP may, for example, be selected from all-aromatic polymers. More preferably it may be selected from the group consisting of: liquid crystal polymer (LCP), polyethersulfone (PES), polyimide (PI), polyetherimide (PEI), polyetheretherketone (PEEK), polyetherketoneketone (PEKK), polyphenylene sulfide (PPS) or polyaryletherketone (PAEK). The first polymer is most preferably selected from the group consisting of LCP, PES, PEI, PEEK, PAEK, PI and PEKK. These polymers are all well known to those skilled in the thermoplastic arts and are readily commercially available.

LCPs are a class of HPPs. LCPs are modeled on the same chemical structure as LCTs and LCT precursors and contain some of the same monomers. However, LCTs are thermosets, whereas the LCPs used as the first polymer are typically thermoplastic polymers. Furthermore, LCT precursors have a much lower molecular weight compared to LCP sand are end-capped with polymerizable groups (e.g. reactive end-groups).

All-aromatic HPPs may comprise at least 90 wt. %, more preferably at least 95 wt. %, even more preferably at least 99 wt. % aromatic monomer units.

The HPPs can have any desirable molecular weight. Suitable HPPs may for instance have number average molecular weight (Mn) of 15,000-60,000 g/mol, e.g. 20,000-60,000 g/mol.

LCT Precursors

The LCT precursors used in the method of the invention and present in the composition of the invention are described in detail below. An LCT precursor is a precursor capable of forming an LCT upon polymerization. LCT oligomers are the most preferred type of LCT precursors that may be used in the present invention.

The term LCT oligomers as used herein may refer to liquid crystal oligomers that form a liquid crystal thermoset when polymerized (e.g. by chain-extension and/or by cross-linking). The LCT oligomers typically are capable of such polymerization by having certain reactive end-groups. The LCT oligomers can thus be regarded as an oligomer of a liquid crystal thermoset, which may have reactive end-groups that make the oligomer capable of forming an LCT when polymerized.

Within the scope of the present invention, the term "oligomer(s)" designates mixtures of varying backbone length liquid crystal polymers, of preferably maximally 500 repeat units, within the weight range of approximately 500 to approximately 15,000 grams per mole (and not more than 20,000 gram/mol) that are not isolated as discreet molecular weight molecules.

LCT oligomers are relatively short linear liquid crystal polymers (LCP). LCPs exhibit higher degrees of molecular order (chain parallelism) while in the molten state than other polymeric species. The ability of these species to maintain molecular order in the molten state has pronounced effects on the solid state physical morphology and the properties of this class of polymers. Specifically, relative to conventional polymers liquid crystalline polymers exhibit molecular order in the solid state and lower melt viscosities at higher molecular weights. The improved molecular order in the solid state makes liquid crystal polymers desirable for uses in shape molded composite materials.

The LCT oligomer preferably comprises a liquid crystal backbone selected from the group consisting of an ester, an ester-imide and an ester-amide, wherein the backbone of the oligomer is entirely, or at least substantially entirely, aromatic in composition. This means that preferably at least 95 mol %, more preferably at least 99 mol %, even more preferably 100 mol % of the monomers present in the backbone are aromatic. Such LCT oligomers are known from WO 02/22706 and are commercially available.

The LCT oligomers typically have reactive end-groups such that the oligomers can react with each other to form a liquid crystal thermoset. Thus, the LCT oligomer may be capable of polymerizing by chain-extension. The liquid crystal oligomers are preferably end-capped with self-reactive end-groups, in which case the LCT oligomer has a general structure of E-Z-E, wherein Z indicates the oligomer backbone and E the self-reactive end-group (hereinafter also referred to as the "self-reactive end-cap" or "end-cap"). A self-reactive end-cap is capable of reacting with another self-reactive end-cap of the same type and to some extent with the HPP it is intended to reinforce. Accordingly, an LCT oligomer with reactive end-caps is capable of chain-extension.

The end-cap is preferably a phenylacetylene, phenylmaleimide, or nadimide end-cap. Good results have been obtained using an end-cap selected from the group consisting of

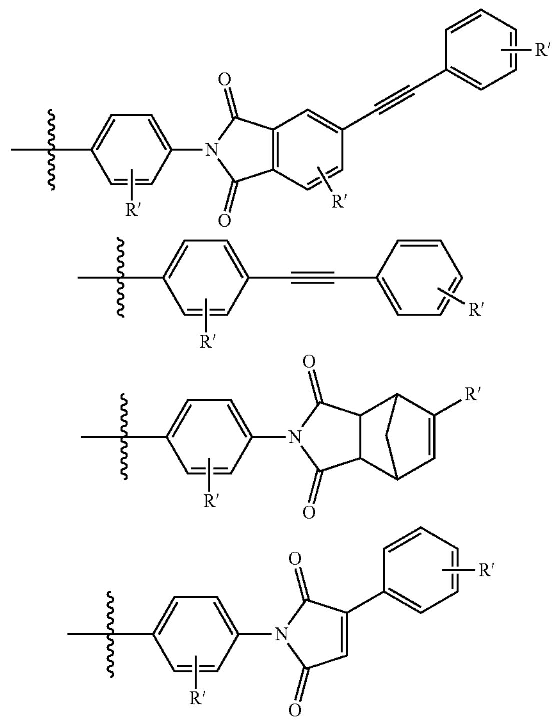

wherein R' is independently selected from the group consisting of hydrogen, alkyl groups containing six or less carbon atoms, aryl groups containing six or less carbon atoms, aryl groups containing less than ten carbon atoms, lower alkoxy groups containing six or less carbons, lower aryloxy groups containing ten or less carbon atoms, fluorine, chlorine, bromine and iodine. For example, R' may be H for all groups.

Of the four end groups depicted above, the first two were found to work best and to be most versatile and are therefore preferred. The last two have a limited processing temperature range and are therefore less preferred.

The end-capped all-aromatic LCT oligomers described herein display many superior and improved properties to their non-end-capped high molecular weight LCP analogs. Among these properties are: unusually lowered melt viscosities for these weight polymer species compared to non-end-capped higher molecular weight LCP analogs and comparable and/or superior to previously end-capped lower weight non-oligomeric species (end-capped single pure molecules), stability of melt viscosities at elevated temperatures for extended periods of time relative to previous liquid crystalline products, and reduced brittleness (i.e. rubber behavior) above the glass transition temperature.

Very good results have been obtained using the end-capped all-aromatic LCT oligomers described in WO 02/22706 as the LCT oligomer in the present invention, in particular in case of the ester based LCT oligomer. Best results have been obtained using the LCT oligomers in combination with HPP as the first polymer.

The LCT oligomers may have a number average molecular weight ($M_n$) of 500-20,000, preferably 1,000-13,000. Such molecular weights provide the LCT oligomers with a relative low viscosity, which results in good processability of the polymer blend used in the method of the invention. Furthermore, the relative low molecular weight was found to result in a LCT network that provides the first polymer with good thermo-mechanical properties. It may further be advantageous to use LCT oligomers having a number average molecular weight ($M_n$) of at least 5,000. Such LCT oligomers provide for a very short curing time.

The LCT oligomers preferably have a backbone having at least one structural repeat unit selected from the group consisting of

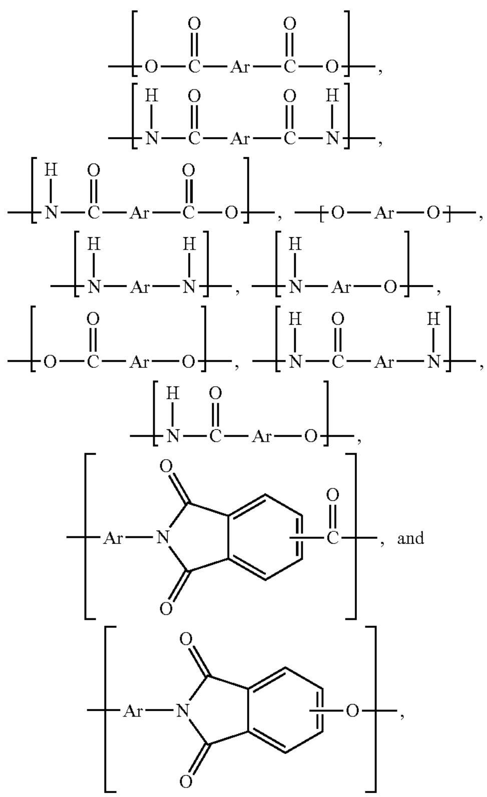

wherein Ar is an aromatic group. Ar may in particular be selected from the group consisting of

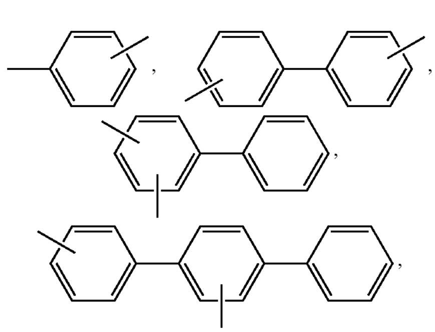

-continued

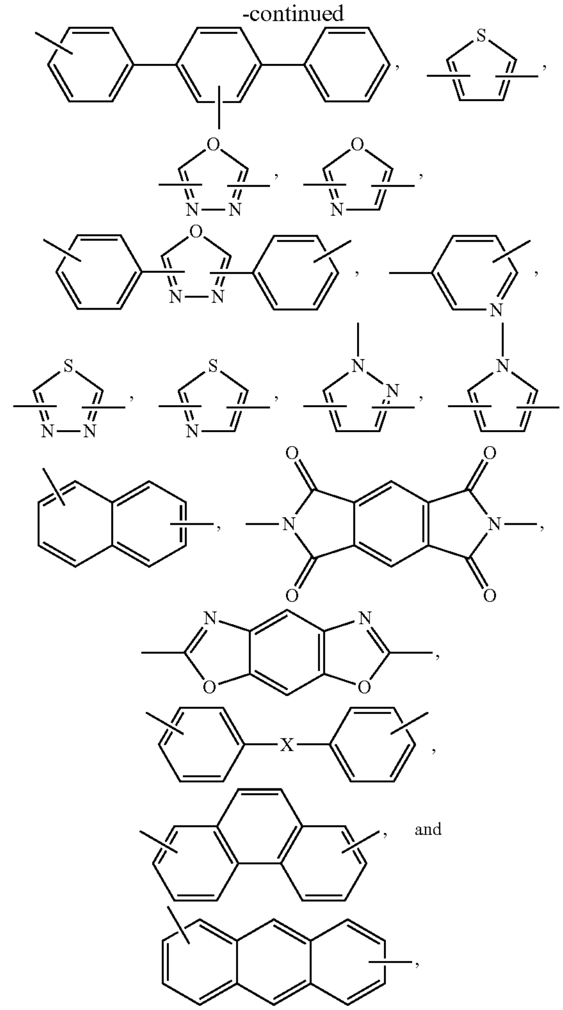

wherein X is selected from the group consisting of

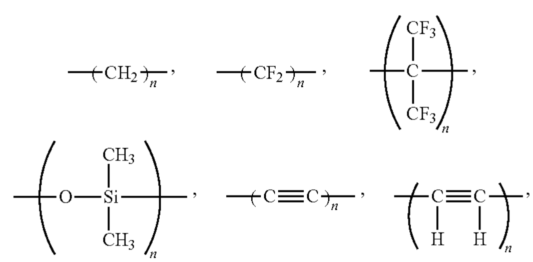

C=O, S, O, and $SO_2$.

wherein n is a number less than 500.

The above-described LCT oligomers are known from WO 02/22706 and can be prepared according to the method described therein.

In a preferred embodiment, the backbone of the LCT oligomers is modified to make it more compatible with the first polymer. For example, arylether and/or arylketone monomers may be introduced into the LCT backbone to make the LCTs more compatible with HPPs, provided that the oligomers remain capable of their liquid crystal orientation. Accordingly, the backbone of the LCT oligomer may comprise arylether and/or arylketone monomers. For example, 1-50 mol % of the monomers (preferably 2.25-40 mol %, more preferably 3-10 mol %) present in the LCT backbone may be arylethers and/or arylketones. It is expected that this will improve the quality of the LCT/polymer blend and/or result in improved thermo-mechanical properties of the polymeric composition.

The invention will be further illustrated by the following examples.

Example 1

Preparation of a PES/LCT Composite

A blend of polyethersulfone (PES, a high-performance polymer; 18 grams, granulate) and LCT (HBA/HNA LCT-5K, a 5000 g/mol reactive liquid crystal oligomer; 4.5 grams, powder) was premixed and fed into an Xplore® twin-screw extruder.

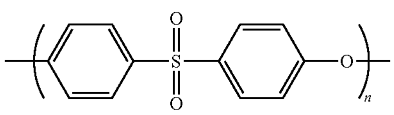

Polyethersulfone (PES)

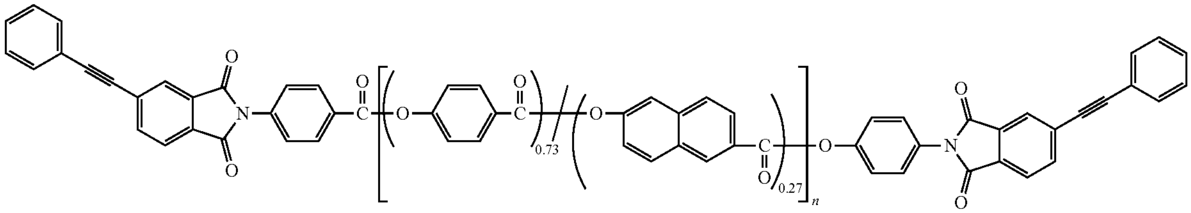

HBA/HNA LCT-5K

The barrel temperature of the extruder was kept at 350° C. and the rotary speed was set at 15 rpm. After all material was added to the extruder the melt was circulated for 1 h 15 min to allow chain extension and crosslinking to take place. During this time the torque increased from 1600 N to 2000 N, which indicated that chain extension was taking place. After 1 h and 1 min the viscosity started to increase rapidly, indicating crosslinking had become the predominate reaction. At this point the melt was transported to the injection-molding machine. The mould temperature was set at 90° C. and the melt was injection moulded into tensile bars.

The tensile properties were determined according to ISO 527-2:1993(E). The molecular composite showed an E-modulus of 1.5 GPa, tensile strength of 863 MPa and elongation at break of 4.5 mm. The neat PES gave an E-modulus of 1.4 GPa, tensile strength of 707 MPa and elongation at break of 14 mm. The tensile samples were submerged in liquid nitrogen and fractured. Electron microscopy (SEM) did not expose any phase separation of the fractured samples.

Example 2

Preparation of a PEI/LCT Composite

A blend of polyetherimide (PEI, a high-performance polymer; 18 grams, granulate) and LCT (HBA/HNA LCT-5K, a 5000 g/mol reactive liquid crystal oligomer; 4.5 grams, powder) was premixed and fed into an Xplore® twin-screw extruder.

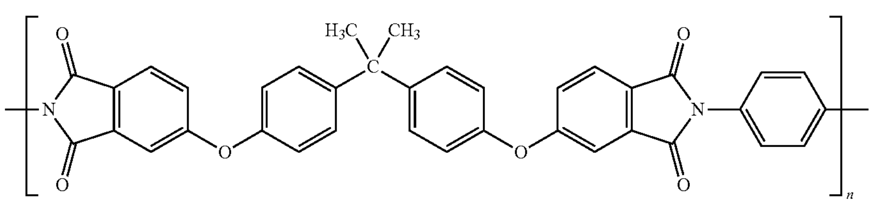

Polyetherimide (PEI)

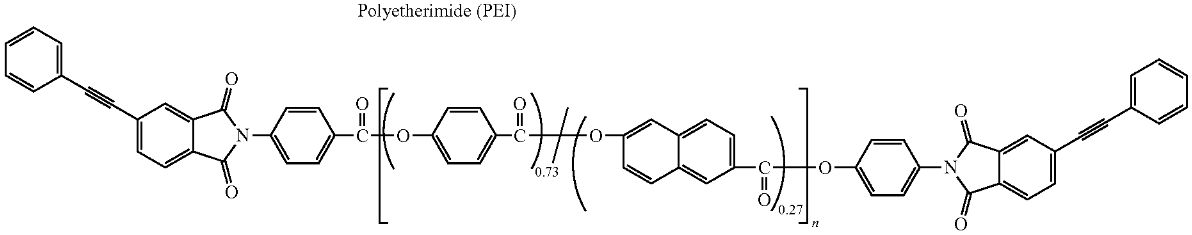

HBA/HNA LCT-5K

The barrel temperature of the extruder was kept at 350° C. and the rotary speed was set at 150 rpm. After all material was added to the extruder the melt was circulated for 40 min to allow chain extension and crosslinking to take place. At this point the melt was transported to the injection-molding machine. The mould temperature was set at 90° C. and the melt was injection moulded into tensile bars.

The resulting composite was analyzed using electron microscopy (SEM). No significant phase separation of the fractured samples was detected.

Example 3

Preparation of a PEEK/LCT Composite

A blend of polyetheretherketone (PEEK, a high-performance polymer; 18 grams, granulate) and LCT (HBA/HNA LCT-5K, a 5000 g/mol reactive liquid crystal oligomer; 4.5 grams, powder) was premixed and fed into an Xplore® twin-screw extruder.

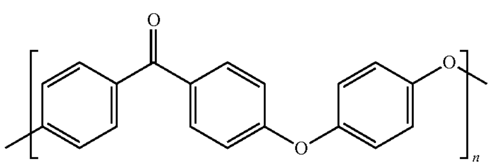

Polyetheretherketone (PEEK)

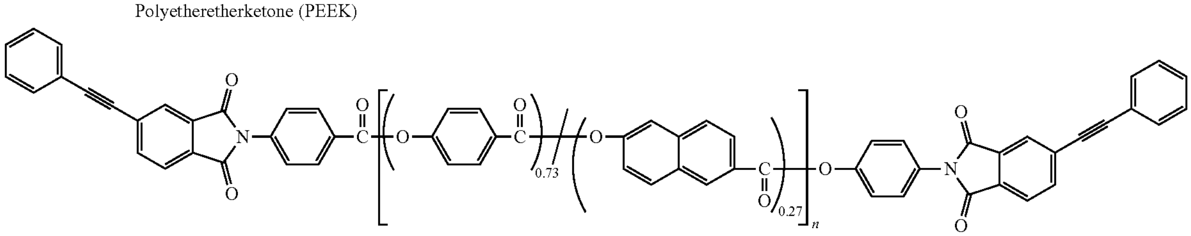

HBA/HNA LCT-5K

The barrel temperature of the extruder was kept at 350° C. and the rotary speed was set at 150 rpm. After all material was added to the extruder the melt was circulated for 40 min to allow chain extension and crosslinking to take place. When the torque reached 5800 N the melt was transported to the injection-molding machine. The mould temperature was set at 90° C. and the melt was injection moulded into tensile bars.

The resulting composite was analyzed using electron microscopy (SEM). No significant phase separation of the fractured samples was detected.

The invention claimed is:

1. Polymeric composition comprising a first polymer and a liquid crystal thermoset (LCT) network that interpenetrates said first polymer, which LCT network comprises LCT oligomers that are at least partly polymerized, wherein the first polymer is selected from the group consisting of polyethersulfone (PES), polyimide (PI), polyetherimide (PEI), polyetheretherketone (PEEK), polyetherketoneketone (PEKK), polyphenylene sulfide (PPS) or polyaryletherketone (PAEK).

2. Polymeric composition according to claim 1, wherein the first polymer and the LCT network are mixed at least in part at a molecular level.

3. Polymeric composition according to claim 1, wherein the first polymer is a high-performance polymer.

4. Polymeric composition according to claim 1, wherein the first polymer is a thermoplastic polymer.

5. Polymeric composition according to claim 1, wherein the oligomers comprise a liquid crystal backbone selected from the group consisting of an ester, an ester-imide and an ester-amide, wherein the backbone of the oligomer is entirely, or at least substantially entirely, aromatic in composition.

6. Polymeric composition according to claim 1, wherein the LCT oligomers have a backbone having at least one structural repeat unit selected from the group consisting of

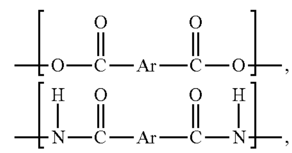

-continued

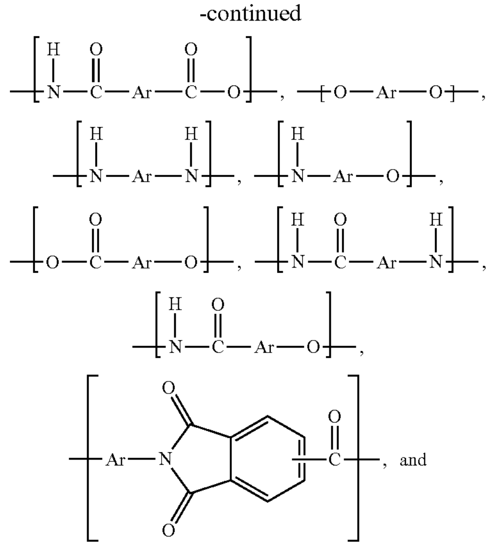

-continued

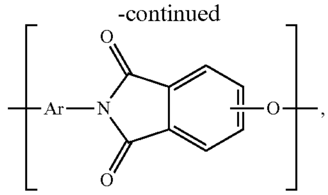

wherein Ar is an aromatic group.

7. Polymeric composition according to claim 1, wherein the composition comprises 1-50 wt. % of the LCT network, based on the total weight of the composition.

8. Polymeric composition according to claim 1, wherein the oligomers have been polymerized by cross-linking via reactive end-groups of the oligomers.

9. Polymeric composition according to claim 1, wherein the degree of crosslinking between the LCT oligomers in the LCT network is 5-40 mol %.

10. Method for preparing a polymeric composition, according to claim 1, comprising the steps of providing a melt of a polymer blend comprising a first polymer and a liquid crystal thermoset precursor (LCT precursor); and initiating polymerization and/or crosslinking in at least part of the LCT precursors.

11. Method according to claim 10, wherein the LCT precursor is a LCT oligomer.

12. Method according to claim 11, wherein the LCT oligomer has a number average molecular weight ($M_n$) of 1,000-13,000.

13. Method according to claim 11, wherein the LCT oligomer has a phenylacetylene, phenylmaleimide, or nadimide end-cap.

14. Method according to claim 11, wherein the LCT oligomer has a self-reactive end-group selected from the group consisting of

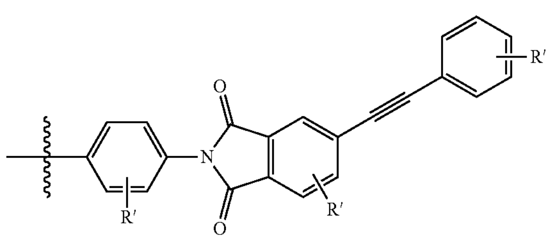

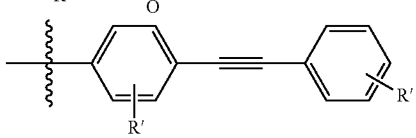

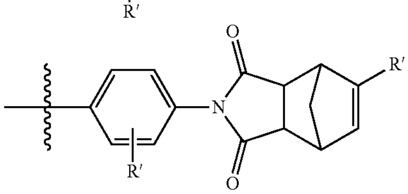

-continued

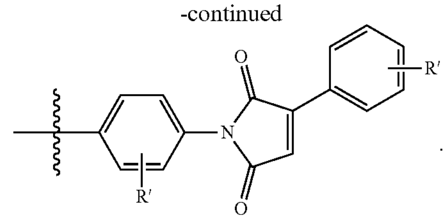

15. Method according to claim 11, wherein the LCT oligomer comprises a liquid crystal backbone selected from the group consisting of an ester, an ester-ketone, an ester-ether, an amide-ketone, an amide-ether, an ester-imide and an ester-amide, wherein the backbone of the oligomer is entirely, or at least substantially entirely, aromatic in composition.

16. Method according to claim 11, wherein the LCT oligomers has a backbone having at least one structural repeat unit selected from the group consisting of

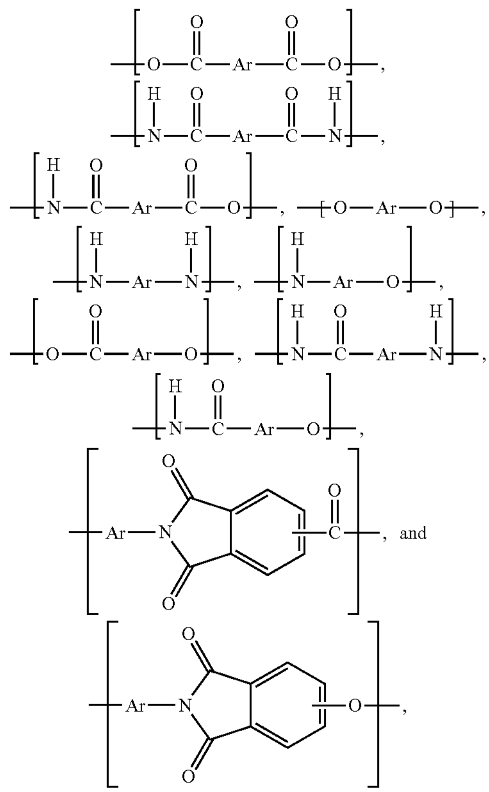

wherein Ar is an aromatic group.

17. Method according to claim 15, wherein the backbone of the LCT oligomer comprises or is substituted with arylether and/or arylketones monomers.

18. Method according to claim 11, wherein the initiating polymerization comprises initiating cross-linking of the LCT oligomers.

19. A fire resistant product comprising a thermoplastic HPP matrix in which is blended an LCT oligomer as defined in claim 12.

* * * * *